(12) United States Patent
Robin et al.

(10) Patent No.: US 8,128,130 B2
(45) Date of Patent: Mar. 6, 2012

(54) PLUG-IN HOSE COUPLING

(75) Inventors: Phillipe Robin, Brindas (FR); Pierre Jullien, Villeneuve (FR)

(73) Assignee: ContiTech Anoflex SAS, Caluire et Cuire (FR)

( * ) Notice: Subject to any disclaimer, the term of this patent is extended or adjusted under 35 U.S.C. 154(b) by 0 days.

(21) Appl. No.: 12/929,296

(22) Filed: Jan. 13, 2011

(65) Prior Publication Data
US 2011/0133447 A1 Jun. 9, 2011

Related U.S. Application Data

(63) Continuation of application No. PCT/EP2009/057237, filed on Jun. 11, 2009.

(30) Foreign Application Priority Data

Jul. 16, 2008 (FR) ..................... 08 54816

(51) Int. Cl.
 *F16L 33/00* (2006.01)
(52) U.S. Cl. ...................... 285/255; 285/249
(58) Field of Classification Search .................. 285/249, 285/243, 255, 339, 307, 113
See application file for complete search history.

(56) References Cited

U.S. PATENT DOCUMENTS

| | | | | |
|---|---|---|---|---|
| 3,679,239 A | * | 7/1972 | Schmitt | 285/148.22 |
| 3,815,940 A | * | 6/1974 | Luckenbill | 285/105 |
| 4,062,572 A | * | 12/1977 | Davis | 285/55 |
| 4,107,452 A | * | 8/1978 | Razvi | 174/84 S |
| 4,229,025 A | * | 10/1980 | Volgstadt et al. | 285/105 |
| 4,282,175 A | * | 8/1981 | Volgstadt et al. | 264/248 |
| 4,407,526 A | * | 10/1983 | Cicenas | 285/27 |
| 4,445,714 A | * | 5/1984 | Kisiel, III | 285/23 |
| 4,712,813 A | * | 12/1987 | Passerell et al. | 285/250 |
| 4,871,196 A | * | 10/1989 | Kingsford | 285/123.1 |
| 4,878,697 A | * | 11/1989 | Henry | 285/250 |
| 5,090,741 A | * | 2/1992 | Yokomatsu et al. | 285/101 |
| 5,102,170 A | * | 4/1992 | Inoue | 285/23 |
| 5,112,087 A | * | 5/1992 | Haruki | 285/101 |
| 5,335,946 A | * | 8/1994 | Dent et al. | 285/243 |
| 5,366,260 A | * | 11/1994 | Wartluft | 285/323 |
| 5,524,940 A | * | 6/1996 | Wartluft | 285/322 |
| 6,142,538 A | * | 11/2000 | Volgstadt et al. | 285/323 |
| 6,145,894 A | * | 11/2000 | Myers | 285/322 |
| 6,371,525 B1 | * | 4/2002 | Passerell et al. | 285/123.15 |
| 6,371,531 B1 | * | 4/2002 | Robison | 285/342 |
| 6,877,777 B1 | * | 4/2005 | Wartluft | 285/255 |

(Continued)

FOREIGN PATENT DOCUMENTS

DE 39 23 579 1/1990

(Continued)

*Primary Examiner* — Aaron Dunwoody
(74) *Attorney, Agent, or Firm* — Walter Ottesen; Christian Ottesen (57) ABSTRACT

A plug-in hose coupling includes a housing input part with a receiving bore widened in an end region which faces toward the interior of the coupling. A tubular support sleeve is sealingly clipped into the widened end region by an annular collar which has multiple outward U-shaped channels. At least one annular seal and one annular holding element, which bears axially against the seal, is in the form of an open lock washer and is supported against an inner conical support face of the housing input part. The support face narrows conically counter to the plug-in direction of the tube end. The holding element has encircling cutting edges on the inner periphery for engaging the tube end. A fastening part is non-detachably joined to the housing input part and support sleeve by an overmolding connecting section.

13 Claims, 7 Drawing Sheets

U.S. PATENT DOCUMENTS

| | | | |
|---|---|---|---|
| 6,932,389 B2* | 8/2005 | Robison | 285/93 |
| 7,255,373 B2* | 8/2007 | Pridham | 285/249 |
| 7,270,317 B2* | 9/2007 | Leonard | 267/64.27 |
| 7,270,349 B2* | 9/2007 | Bamberger et al. | 285/322 |
| 7,404,581 B2* | 7/2008 | Baving et al. | 285/242 |
| 7,900,973 B2* | 3/2011 | Herberg et al. | 285/331 |
| 7,922,215 B2* | 4/2011 | Salomon-Bahls et al. | 285/339 |
| 2004/0169370 A1* | 9/2004 | Chelchowski et al. | 285/249 |
| 2004/0239110 A1* | 12/2004 | Pedersen et al. | 285/255 |
| 2005/0121908 A1* | 6/2005 | Densel et al. | 285/322 |
| 2006/0108802 A1* | 5/2006 | Baumgartner | 285/322 |

FOREIGN PATENT DOCUMENTS

| | | |
|---|---|---|
| DE | 92 08 519 U1 | 3/1993 |
| DE | 43 00 004 | 7/1994 |
| DE | 296 21 046 U1 | 1/1997 |
| EP | 1 258 666 | 11/2002 |
| WO | WO 2005/022022 | 3/2005 |

* cited by examiner

PLUG-IN HOSE COUPLING

CROSS REFERENCE TO RELATED APPLICATIONS

This application is a continuation application of international patent application PCT/EP 2009/057237, filed Jun. 11, 2009, designating the United States and claiming priority from French application 0854816, filed Jul. 16, 2008, and the entire content of both applications is incorporated herein by reference.

FIELD OF THE INVENTION

The invention relates to a plug-in hose coupling for the non-detachable connection of hoses or tubes composed of plastic or elastomeric material. The plug-in hose coupling includes: a housing input part which has a receiving bore and in which the receiving bore is widened in an end region facing towards the interior of the coupling; a tubular support sleeve which projects concentrically into the interior of the housing input part proceeding from the widened end region, onto which tubular support sleeve a tube or hose end can be pushed as far as an end stop situated at the end of the support sleeve; the support sleeve being sealingly clipped into the widened end of the receiving bore by an annular collar situated at one end of the support sleeve and having multiple outward U-shaped deflections; at least one annular seal which bears against the inner periphery and one annular holding element which bears axially against the seal for a tube end which can be plugged into the free end of the receiving bore being arranged concentrically in the space, which is formed by the collar of the support sleeve and the housing input part, in the region of the widening of the receiving bore; the holding element being embodied in the form of an open lock washer and being supported against an inner conical support surface of the housing input part in the region of the widening of the receiving bore, which support surface narrows conically counter to the plug-in direction of the tube end, and with the holding element having encircling cutting edges on the inner periphery; and, a fastening part, which has a throughflow bore which is aligned with, the receiving bore, for attaching the plug-in hose coupling to a motor vehicle unit.

BACKGROUND OF THE INVENTION

Plug-in hose, couplings are attachment fittings which are also referred to as quick-action plug-in connections.

These plug-in hose couplings are used primarily in low-pressure systems wherein plastic tubes or hoses are often provided for conveying fluid.

Below, for simplification, the term "tube" is also used for hoses.

The plug-in hose couplings afford the advantage that the tube can be fixedly connected to the plug-in hose coupling by simple insertion into the receiving bore.

This leads to a considerable simplification of assembly, which is important primarily in vehicle assembly.

The fixing of the tube in the plug-in hose coupling is brought about by an integrated holding element which is radially resilient.

In the plug-in hose couplings, the resilient holding element is often embodied either as a plate-spring-like, closed or open toothed disc ring or as a slotted lock washer with one or more cutters.

As the tube is passed through, the annular holding element is firstly slightly opened, so that it lies with a slight radial contact pressure around the outer surface of the tube.

This takes place relatively easily since the annular holding element is usually conically beveled or widened in the plug-in direction. The widening can also take plate by means of a pilot ring which is arranged in front of the tube end and is provided with an insertion cone.

When the tube is pulled back, the cutters or teeth then dig into the outer surface of the tube and prevent the tube from being pulled back further.

In the case of a slotted, correspondingly conically formed lock washer, a conical support face is necessary for this purpose, against which the lock washer is supported with its outer face and whose conicity is arranged such that the diameter of the lock washer is reduced in the pulling-out direction of the tube. In this way, the holding force of the lock washer is increased with increasing pulling-out force.

Attachment fittings of the above type are known, for example, from DE 39 23 579 A1, DE 9208519 U1 or DE 43 00 004 A1, with DE 39 23 579 A1 disclosing a system with a toothed disc or lock washer, and with DE 9208519 U1 and DE 43 00 004 A1 disclosing a system with a lock washer.

In the plug-in hose couplings described, the parts, such as seals, conical support rings and holding rings or lock washers are arranged in a predetermined sequence in the throughflow bore of the housing and are fixedly held in position by rolling in or flanging the wall of the housing in the throughflow bore.

A disadvantage of all of these solutions is that, for holding all of the parts required for sealing and for fixing the tube in the plug-in hose coupling in the housing, a relatively long bore, and when using a slotted lock washer, an additional wedge element, are required.

As a result, firstly the production and handling of the housing blanks is complex, and secondly the assembly with an additional component, the wedge element, is also encumbered.

SUMMARY OF THE INVENTION

It is an object of the invention to provide a plug-in hose coupling of the type described in the introduction which is characterized by simple assembly with few parts.

The object is achieved with a plug-in hose coupling for the non-detachable connection of hoses or tubes composed of plastic or elastomeric material. The plug-in hose coupling of the invention includes: a housing input part which has a receiving bore and in which the receiving bore is widened in an end region facing towards the interior of the coupling; a tubular support sleeve which projects concentrically into the interior of the housing input part proceeding from the widened end region, onto which tubular support sleeve a tube or hose-end can be pushed as far as an end stop which is situated at the end of the support sleeve; the support sleeve being sealingly clipped into the widened end of the receiving bore by means of an annular collar which is situated at one end of the support sleeve and having multiple outward U-shaped deflections; at least one annular seal which bears against the inner periphery and one annular holding element which bears axially against the seal for a tube end which can be plugged into the free end of the receiving bore being arranged concentrically in the space, which is formed by the collar of the support sleeve and the housing input part, in the region of the widening of the receiving bore; the holding element being embodied in the form of an open lock washer and being supported against an inner conical support surface of the housing input part in the region of the widening of the receiving bore, which support surface narrows conically counter to the plug-in direction of the tube end, and with the holding element having encircling cutting edges on the inner periphery; a fastening part, which has a throughflow bore which is aligned with the receiving bore, for attaching the plug-in hose coupling to a motor vehicle unit; and, the fastening part being non-detachably joined together with the unit of axially plugged into one another housing input part and support sleeve by overmolding of an outer connecting section (overmolding portion) or being formed by means of overmolding of the unit itself.

By "overmolding" is meant in the present text any process allowing the formation of a part having a determined shape and wherein at least a portion of the part coats one or more other parts. Preferably, overmolding is carried out by injection of a plastic material into a mold, the invention not being limited to this technique.

The arrangement according to the invention has the advantage that the inner annular seal and the holding element, which seal off and fixedly hold the tube which can be pushed in during the later final assembly, are arranged in the housing input part.

It is possible to dispense with a separate seal between the housing input part and the fastening part.

The support sleeve serves to support the pushed-in tube from the inside in order to prevent an excessive constriction of the tube as a result of the radial contact pressure of the narrowing holding element which is embodied as a lock washer.

The housing input part and support sleeve form a type of cartridge in which the parts which fixedly hold and seal off the tube which is to be plugged in later, such as the inner annular seal and holding element, are inserted securely and in a captive fashion.

The cartridge is placed as a unit together with a coaxially placed-on fastening part into an injection mold and is overmolded with a connecting section at the parting point of the two parts. After the hardening of the overmolding material, a non-detachable connection is generated between the cartridge and the fastening part.

The close-fitting, resilient insertion of the collar of the support sleeve into the widened end opening of the housing input part prevents a flow of the molding material into the interior of the cartridge.

It is alternatively possible for the fastening part to be formed during the overmolding by the overmolding itself.

In one advantageous embodiment of the invention, the outer connecting section produced by the overmolding or the fastening part produced by the overmolding is composed of a hardening thermoplastic plastic material, preferably of polyamide.

The use of plastic as a molding material for the overmolding has the advantage that further functional elements can also be produced in a cost-effective manner by being simply integrally formed during the injection molding process.

In addition, advantageous fusion with the overmolded end region of the housing input part takes place if the latter is likewise produced from plastic. A secure connection is thus provided.

If the fastening part is composed of metal, it is connected in a form-fitting manner by the molding material of the connecting section.

In a further advantageous embodiment of the invention, the fastening part is composed of metal and has an external threaded section at its free end. The fastening part is advantageously composed of brass.

In a further advantageous embodiment of the invention, the fastening part is formed by the overmolding process itself and constitutes a plug.

In a further advantageous embodiment of the invention, the collar which is arranged at the end of the support sleeve is composed of two U-shaped wall sections which are aligned counter to one another.

In this way, a flexible outer wall part is formed on the collar by means of which the support sleeve can be securely clipped into the widened end of the housing input part.

In addition, the two U-shaped wall sections create a radial contact face which is aligned towards the seal in the housing input part, which contact face supports the seal.

A further advantage of the arrangement is that an end axially protruding annular flange of the fastening part can be enclosed in the free annular space of the outer U-shaped wall section, and thereby guides the support sleeve in an aligned fashion.

With the solution according to the invention, a plug-in hose coupling is created which, with a small number of easy-to-assemble parts and while being of small installation size, permits a secure and simple connection to the tube.

By using plastic as a molding material for the overmolding, functional elements can also be produced in a cost-effective manner by being simply integrally formed during the injection molding process.

The individual parts are compact and less susceptible to mechanical damage.

By means of the invention, it is possible to dispense with guidance of the housing input part through the fastening part, so that the latter can be of smaller construction because it need no longer be locked to the housing input part at the periphery. The locking action is assumed by the overmolded connecting section.

The smaller design of the fastening part leads to a considerable saving of the body volume, which is advantageously noticeable in considerably lower costs in particular in the case of fastening parts composed of brass.

The expansion of the connecting section is restricted in order to produce a good connection to the end regions of housing input part and fastening part. This has the advantageous result that the inner seal in the housing input part is situated outside the overmolded region and is not subjected to any negative action of heat.

From WO 2005/022022 A1, it is known to connect a metal tube which has an end flange to a tube branch by means of an overmolded plastic shell. A plug-in hose coupling with its particular problems and its special construction is not disclosed here.

The invention also relates to a method for making the plug-in hose coupling according to the invention. The method comprises the following steps:

a) a holding element in the form of a cutting lock washer is placed into the housing input part against the inner conical support face;

b) the sealing ring is placed over the cutting lock washer into the widened inner end region of the housing input part;

c) the support sleeve is inserted into the housing input part on that end which is situated opposite the plug-in opening, and is fixedly clipped into the widened opening by means of the collar;

d) the clipped-together modular unit composed of the housing input part and support sleeve is placed together axially with a fastening part and placed into an injection mold; and, e) in the injection mold, the end regions of the housing input part and fastening part are coated by overmolding so as to form a connecting section, with the parts being fixedly connected so as to form a modular unit after hardening.

BRIEF DESCRIPTION OF THE DRAWINGS

The invention will now be described with reference to the drawings wherein:

FIG. 4 shows the plug-in hose coupling produced from the individual parts shown in FIG. 3, with the tube end plugged in;

DESCRIPTION OF THE PREFERRED EMBODIMENTS OF THE INVENTION

Figure 1:
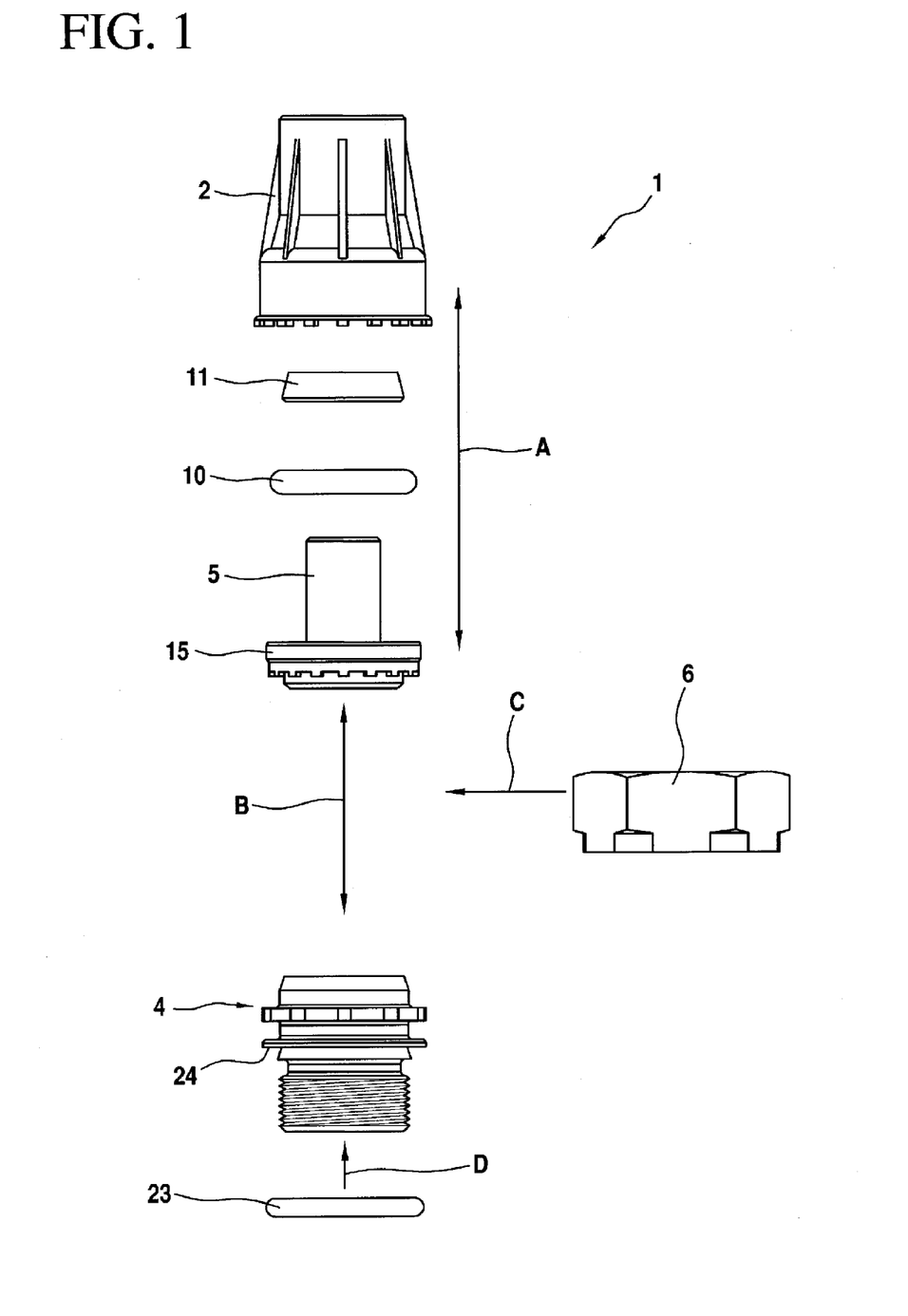
FIG. 1 shows the individual parts of the plug-in hose coupling in the predetermined sequence of assembly.
Figure 2:
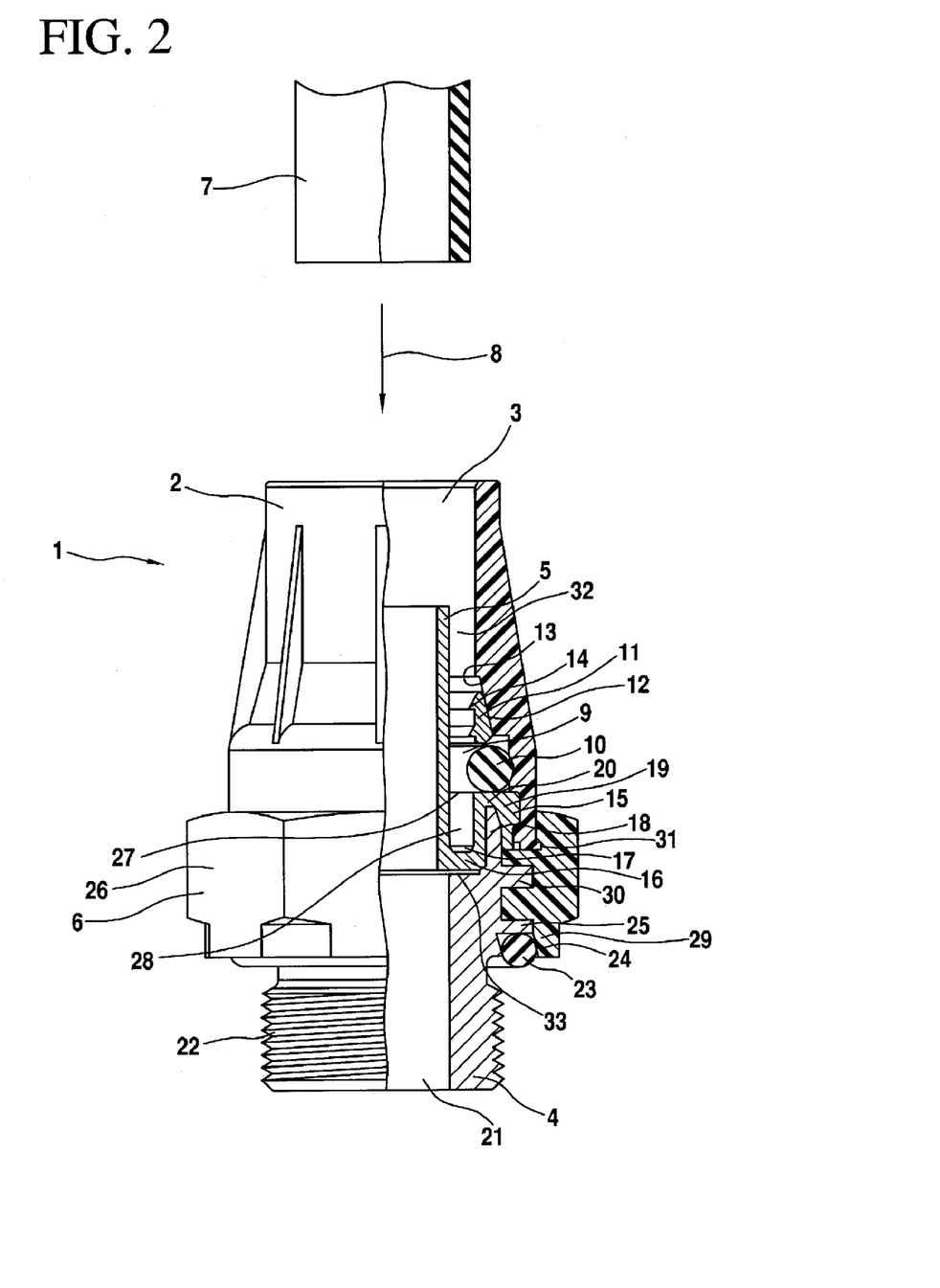
FIG. 2 shows the plug-in hose coupling produced from the individual parts shown in FIG. 1.

In FIG. 1, for explanation of the assembly of the plug-in hose coupling 1 according to the invention and shown in FIG. 2, the individual parts are illustrated schematically in the sequence of assembly. The production steps as far as the complete plug-in hose coupling 1 are indicated schematically by means of process arrows.

The plug-in hose coupling 1 has a housing input part 2 into which, after a sealing ring 10 and a holding element 11 have been placed on, a support sleeve 5 is pushed and clipped in (working arrow A). The structural unit thus formed in step A, a type of cartridge, is placed axially together with a fastening part 4 (working arrow B).

This combination is placed into an injection mold (not shown here) and is overmolded with a thermoplastic molding material around the respective end regions, which face towards one another, of the housing input part 2 and, the fastening part 4 so as to form a connecting section 6 in the shape of a hexagon (working arrow C).

After the hardening of the thermoplastic molding material from which the connecting section 6 has been formed, an annular seal 23 is placed at the underside 24 of the flange 25 of the fastening part 4 (working arrow D) to reach a good tightness to a motor vehicle unit, the plug-in hose coupling 1 according to the invention and illustrated in FIG. 2 is finished and can be fastened to a motor vehicle unit.

FIG. 2 illustrates the plug-in hose coupling 1 according to the invention in the fully-assembled state as a half-section.

The plug-in hose coupling 1 has a housing input part 2 with a receiving bore 3. The housing input part 2 is non-detachably connected to a fastening part 4, so as to enclose a support sleeve 5, by means of a plastic, form-fitting, outer connecting section 6 (overmolded portion) which is overmolded around the ends of the plug-in hose coupling 1 and fastening part 4. The housing input part 2 is composed of plastic, and the fastening part 4 is composed of metal, preferably brass.

During a later assembly in the automobile factory, a tube or hose end 7 is pushed in the direction of the arrow 8 into the receiving bore 3 of the housing input part 2.

Arranged concentrically are an annular seal 10 which bears against the inner periphery in the widened end region 9 of the receiving bore 3 and an annular holding element 11 which bears axially against the seal 10 for a tube end 7 which can be plugged into the receiving bore 3.

The holding element 11 is embodied in the form of an open lock washer and is supported with its outer face 12, which is formed like a truncated cone, against an inner conical support face 13 of the housing input part 2, which support face 13 narrows conically counter to the plug-in direction 8 of the tube end 7.

The holding element 11 has encircling cutting edges 14 on the inner periphery.

Arranged in the interior of the receiving bore 3 is the tubular support sleeve 5 which is supported on the fastening part 4 with an annular collar 15. The annular collar 15 is concentric and is situated at one end of the support sleeve 5 and has multiple U-shaped deflections, and onto which the tube end 7 can be pushed up to a base flange 16 of the collar 15, in the first U-shaped deflection 17 thereof at the end of the support sleeve 5.

The base flange 16 thus forms an end stop for the tube end 7, which is to be pushed in, and lies on an inner shoulder 33 of the fastening part 4, from which an end annular flange 18 extends axially and engages into the collar 15 at a second U-shaped deflection 19.

The base wall 20 of the second U-shaped deflection 19, which is aligned counter to the first U-shaped deflection 17, is supported on an inner shoulder 27 at the end of the housing input part 2 which, in this region, has a larger inner diameter than the receiving bore 3 at the plug-in opening.

The outer diameter of the support sleeve 5 is dimensioned such that an annular gap 32 is formed between the outer wall of the support sleeve 5 and the inner wall of the receiving bore 3, into which annular gap 32 the tube end 7 is pushed during the tube assembly.

In the interior of the housing input part 2, the holding element 11, which is embodied as a lock washer, is arranged in the region of the conical support face 13.

The lock washer 11 has one cut at the periphery at a point which is not visible here, so that the lock washer 11 can be compressed or expanded radially.

The lock washer 11 is supported with its outer face 12, which is formed like a truncated cone, against the support face 13 of the housing input part 2, with the outer face 12 and the support face 13 being parallel to one another.

The support face 13 and outer face 12 are designed such that the large diameter of the truncated cone points towards the fastening part 4.

Arranged at the inner periphery of the lock washer 11 are two annular cutting edges 14 which have a triangular cross section. In the region of the cutting edges 14, the inner diameter of the lock washer 11 is slightly smaller than the outer diameter of a tube 7 which is to be pushed through the receiving bore 3 into the plug-in hose coupling 1.

The fastening part 4 has a throughflow bore 21 which is aligned with the receiving bore 3.

The fastening part 4 is suitable for attaching the plug-in hose coupling 1 to a component, for example a motor vehicle unit.

For this purpose, the fastening part 4 is composed of metal, preferably of brass, and has a threaded section 22 with which the plug-in hose coupling 1 is screwed into the component.

An annular seal 23 in the underside 24 of an encircling annular flange 25 of the fastening part 4 serves as a seal against the component (not shown here).

After the seal 10 and the holding element 11 are first placed into the housing input part 2, the housing input part 2 with the axially plugged-in support sleeve 5 and the fastening part 4 are joined together in a non-detachable manner by means of overmolding of the outer connecting section 6 (called "overmolding portion").

Here, the combination of the individual parts is placed into an injection mold and is overmolded (injection molding) with a hardening thermoplastic plastic material, preferably composed of polyamide.

An encircling, axially extending collar 29 is also produced during the overmolding at the end of the connecting section 6, which collar 29 secures the seal 23 on the underside 24 of the annular flange of the fastening part 4, in which a groove which is open axially towards the free end of the fastening part 4 is formed in this way, in which groove the seal 23 is seated so as to be secured in position with a slight radial load.

The fastening part 4 has a further annular flange 30 which is spaced apart axially from the annular flange 25 which supports the seal 23 on its underside 24.

The plastic material which is injected into the injection mold can thus be well anchored on the fastening part 4. The annular flanges 25 and 30 can be provided on their outer peripheral faces with small projections and/or notches, which further improves an anchoring of the plastic material.

The anchoring of the plastic material on the housing input part 2 is secured by means of a peripherally extending lug 31 on the inner end of the housing input part 2.

The connecting section 6 has spanner flats 26 formed thereon by the injection molding process. With the spanner flats 26, corresponding tools for screwing the plug-in hose coupling 1 into threaded bores of the component, which is to be supplied, a motor vehicle unit, can be engaged.

A plug-in hose coupling 1, which is produced in this way, is positionally fixedly screwed into a component which is to be fluidically connected. The components can be motor vehicle units such as brake valves etc.

The sealing of the screw-in location is obtained by pressing-on the seal 23.

The assembler needs only to handle one uniform part, the complete plug-in hose coupling 1 which constitutes a preproduced component, in order to prepare the motor vehicle unit for a hose attachment. The assembly time is greatly reduced.

The connection of the motor vehicle unit, which is provided with the plug-in hose coupling 1, to a hose or a plastic tube in order to obtain a fluid connection is obtained by plugging a tube or hose end 7 into the receiving bore 3 of the plug-in hose coupling 1.

When the tube end 7, as it is inserted, reaches the holding element 11 embodied as a lock washer, the lock washer 11 is pressed into the plug-in hose coupling 1 and is supported on the seal 10. Here, the lock washer 11 is slightly opened, so that the tube 7 can pass through. After passing the lock washer 11 and the seal 10, the tube 7 is pushed into the annular gap 28 of the collar 15 formed by the first U-shaped deflection 17 until the tube end 7 bears against the stop 16.

As a result of the widening of the lock washer 11, the latter bears with a slight contact pressure against the tube 7.

The pressure is intensified in that the lock washer 11 is pushed back by the restoring spring force of the seal 10.

Here, the cutting edges 14 dig into the surface of the tube 7. If the tube 7 is pulled back counter to the insertion direction out of the plug-in hose coupling 1, the lock washer 11 is taken with it.

As a result of the support of the lock washer 11 on the support face 13, the diameter of the lock washer 11 is reduced in the process, and the cutting edges 14 dig deeper into the surface of the tube 7 until the movement comes to a standstill.

The tube 7 is now non-detachably connected to the plug-in hose coupling 1.

Figure 3:
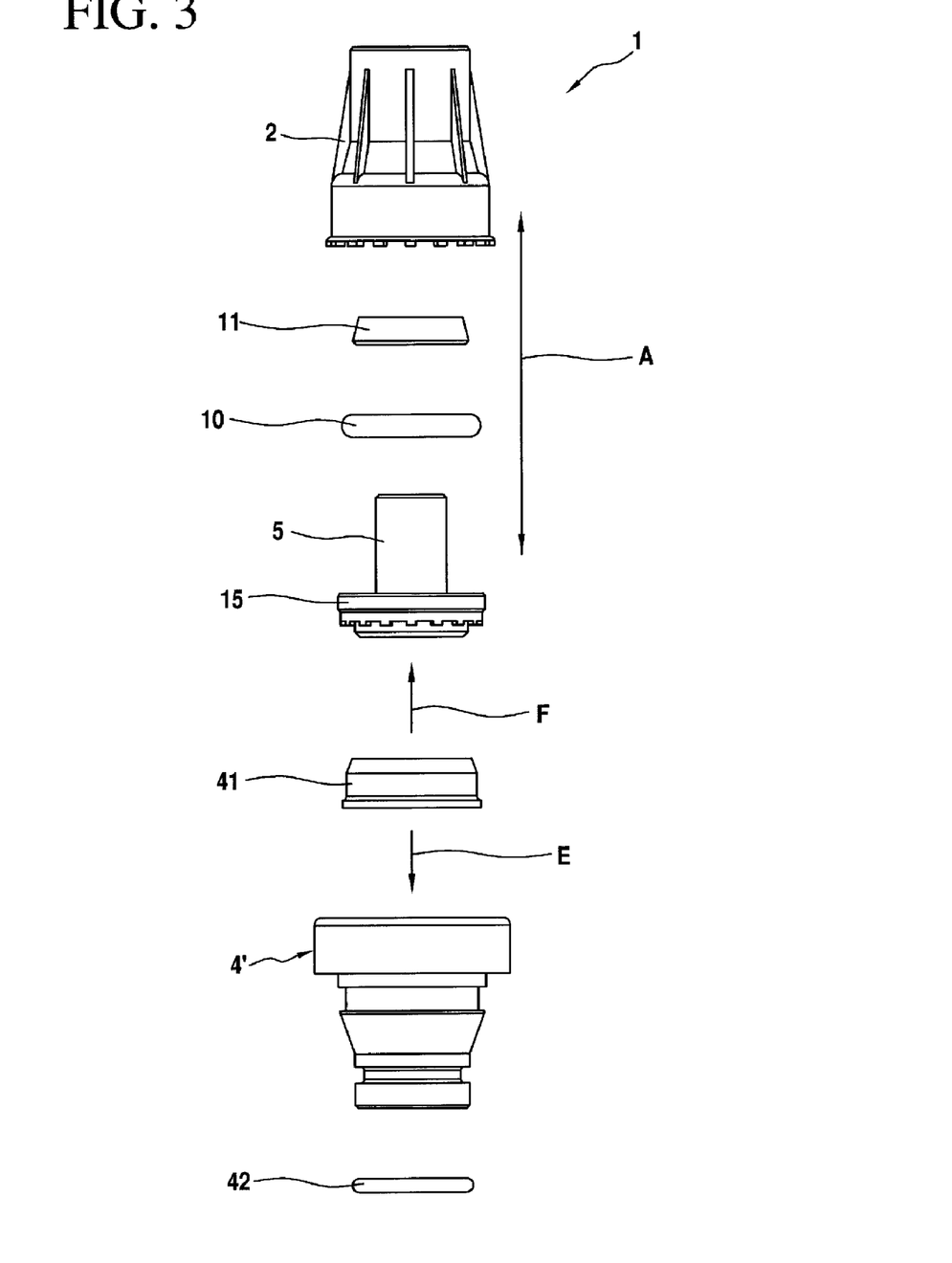
FIG. 3 shows the individual parts of a modified plug-in hose coupling in the predetermined sequence of assembly.
Figure 4:
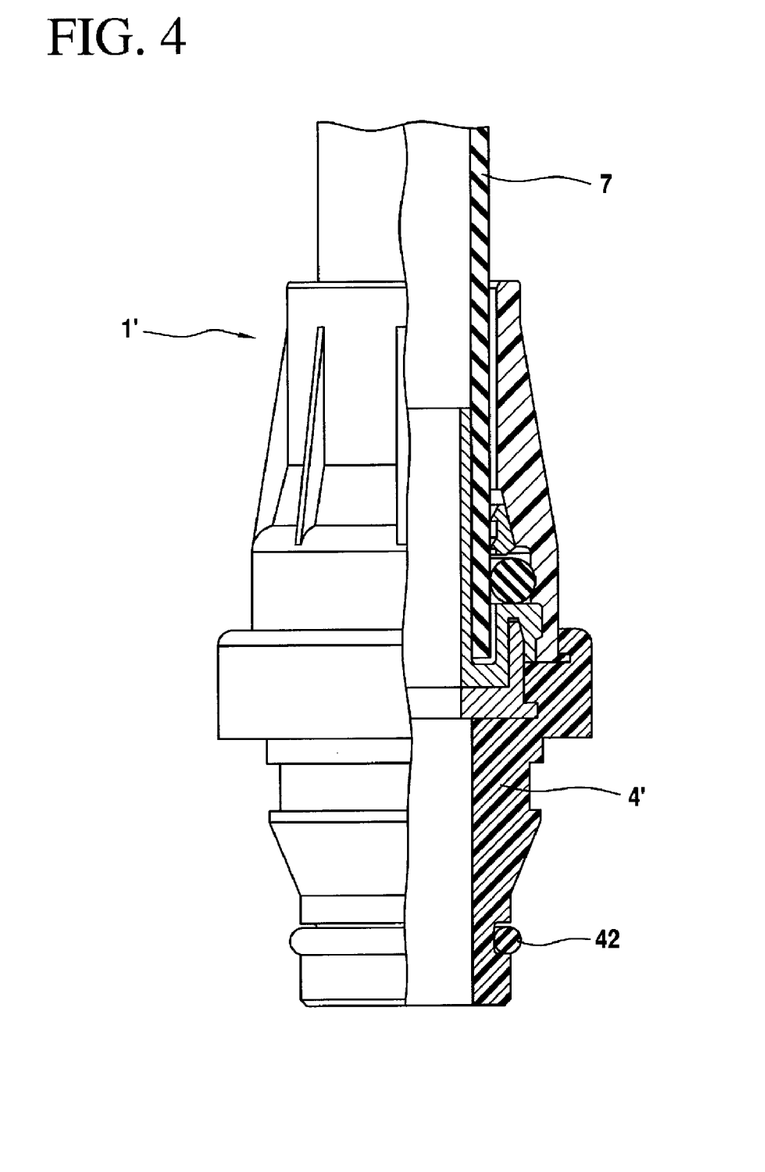
Figure 5:
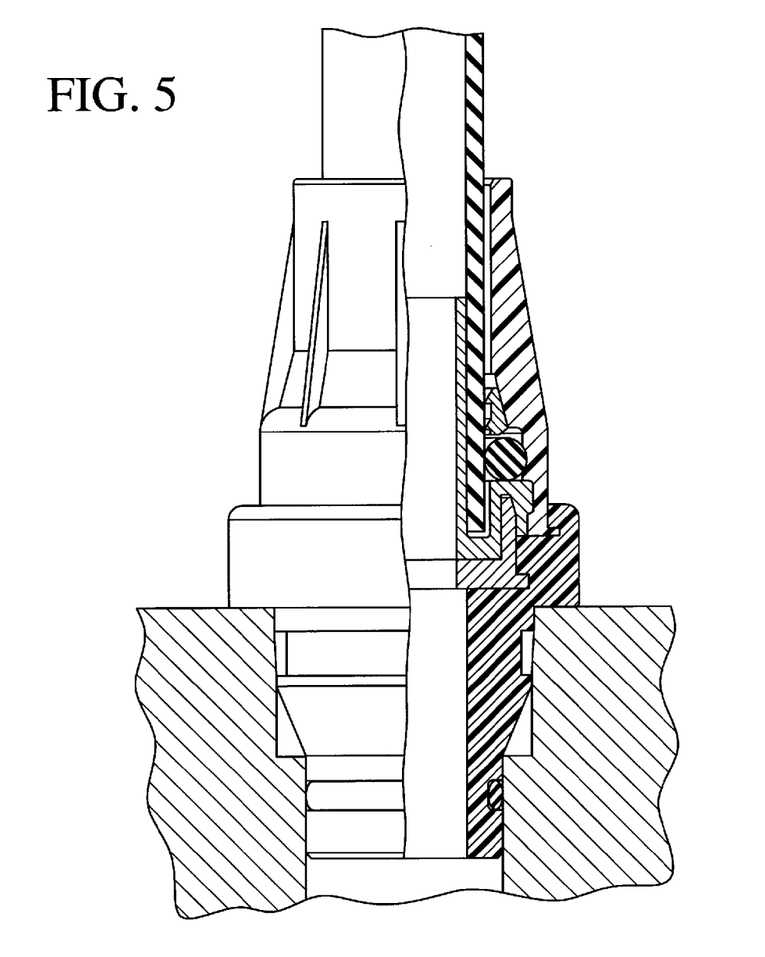
FIG. 5 shows the plug-in hose coupling of FIG. 4 within a part mold.
Figure 6:
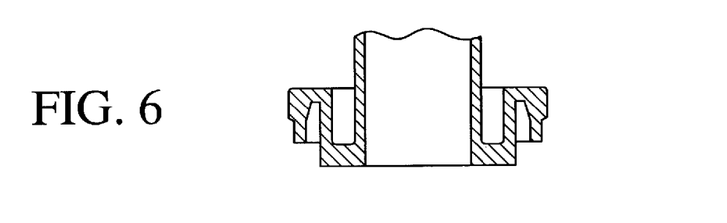
FIG. 6 shows the annular collar separately with the two U-shaped wall sections aligned counter to one another.
Figure 7:
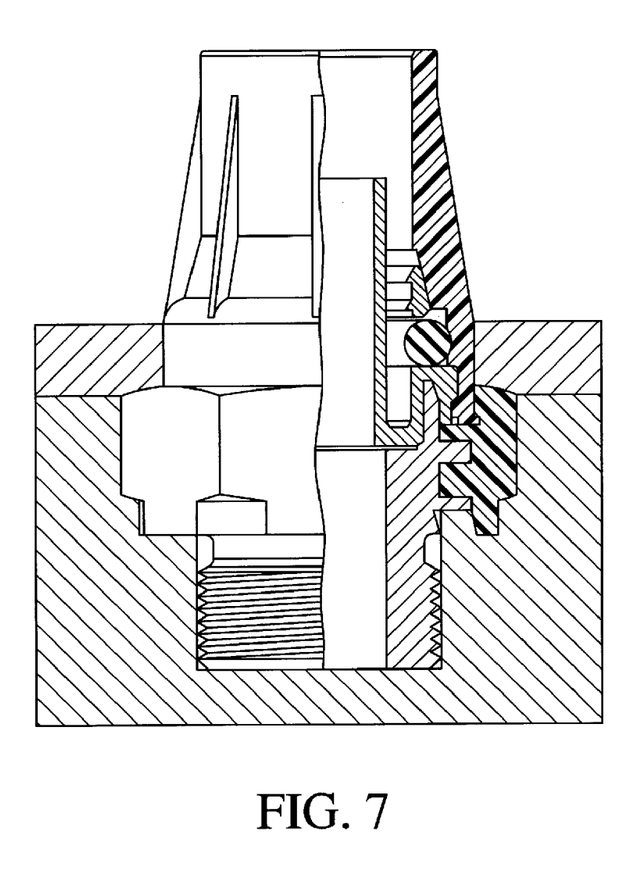
FIG. 7 shows the clipped together modular unit in a mold.
Figure 8:
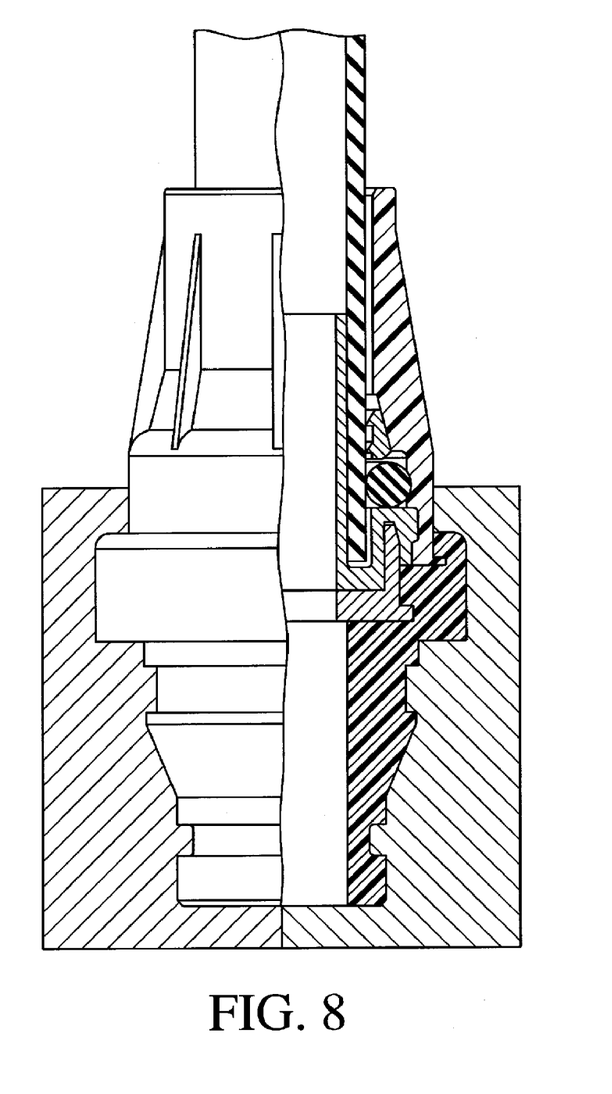
FIG. 8 shows the modular unit alone in an injection mold.

FIGS. 3 and 4 illustrate a modified embodiment of the plug-in hose coupling 1 according to the invention with the tube end 7 plugged in. Identical parts are provided with the same reference numerals as used in the first exemplary embodiment. Modified parts with the same function are denoted by an additional apostrophe.

The combination of the housing input part 2 and support sleeve 5, including the sealing ring 10 and the holding element 11, is identical to that described in the first embodiment. The housing input part 2 and support sleeve 5 are composed of plastic material. The holding element 11 which is embodied as a lock washer is composed of metal, preferably brass.

The fastening part 4' is not present as an individual part as the other parts are placed together, which is shown by the arrow.

The fastening part 4' is produced by means of shaped overmolding only after the placing-in of the cartridge unit, which is formed from the housing input part 2 and the support sleeve 5, with the placing-in of a metallic annular reinforcement part 41 which engages into the collar 15 of the support sleeve 5 (working arrow F).

The plug-in hose coupling V is generated which is illustrated in section in FIG. 4 and in which the fastening part 4' is produced in the form of a plug by the overmolding process.

The plug 4' is provided retroactively with an outer sealing ring 42 to produce a sealing action when plugged into a corresponding receiving opening on a motor vehicle unit.

FIGS. 5 to 8 illustrate the method steps for, making the plug-in hose coupling of the invention for a non-detachable connection of a hose or tube made of plastic or elastomeric material.

It is understood that the foregoing description is that of the preferred embodiments of the invention and that various changes and modifications may be made thereto without departing from the spirit and scope of the invention as defined in the appended claims.

What is claimed is:

1. A plug-in hose coupling for a non-detachable connection of a tube or hose made of plastic or elastomeric material, said coupling comprising:

a housing input part defining an interior and having a receiving bore formed therein;

said receiving bore defining a plug-in opening for receiving an end of said hose and having an end region facing toward said interior and away from said plug-in opening and said receiving bore being widened in said end region thereof;

a tubular support sleeve projecting concentrically into said interior and extending from said end region and said tubular support sleeve being adapted to accommodate said hose thereon when pushed into said receiving bore in a push-in direction;

said support sleeve having an end stop for receiving the end of said hose thereagainst when pushed over said tubular support sleeve;

said tubular support sleeve having an annular collar at one end thereof defining said end stop and said annular collar being configured to coact with said housing input part to sealingly clip said tubular support sleeve into said widened end region;

said housing input part having an inner periphery at said end region;

at least one annular seal bearing against said inner periphery in said widened end region;

said annular seal being arranged concentrically in a space which is formed by said annular collar of said tubular support sleeve and the housing input part in the area of said widened end region of said receiving bore;

an annular holding element bearing axially against said annular seal;

said holding element being configured for the hose end of said hose pushed through said plug-in opening and into said receiving bore;

said annular holding element being arranged concentrically in said space and bearing against said annular seal;

said housing input part having an inner conical support surface in the area of said widened end region of said receiving bore with said inner conical support surface being tapered to narrow conically in a direction counter to said plug-in direction;

said holding element being supported against said inner conical support surface;

said holding element having an inner periphery and encircling cutting edges on said inner periphery for engaging the hose end;

a fastening part having a throughflow bore aligned with said receiving bore;

said fastening part being configured to attach said plug-in hose coupling to a motor vehicle unit; and, an overmold structure fixedly and directly joining said fastening part to said housing input part and said tubular support sleeve so as to provide a direct and uninterrupted seal-tight connection therebetween completely devoid of a separate sealing element.

2. The plug-in hose coupling of claim 1, wherein said holding element is configured in the form of an open lock washer.

3. The plug-in hose coupling of claim 1, wherein said overmold structure is at least partially made of a hardening thermoplastic plastic material.

4. The plug-in hose coupling of claim 3, wherein said thermoplastic plastic material is polyamide.

5. The plug-in hose coupling of claim 2, wherein said fastening part is made of metal and has an external threaded section at its free end.

6. The plug-in hose coupling of claim 5, wherein said metal is brass.

7. The plug-in hose coupling of claim 2, wherein said fastening part is formed as part of said overmold structure and defines a plug.

8. The plug-in hose coupling of claim 2, wherein said annular collar comprises two U-shaped wall sections which are aligned counter to one another.

9. A method for making a plug-in hose coupling for a non-detachable connection of a tube or hose made of plastic or elastomeric material, said plug-in hose coupling including: a housing input part defining an interior and having a receiving bore formed therein; said receiving bore defining a plug-in opening for receiving an end of said hose and having an end region facing toward said interior and away from said plug-in opening and said receiving bore being widened in said end region thereof; a tubular support sleeve projecting concentrically into said interior and extending from said end region and said tubular support sleeve being adapted to accommodate said hose thereon when pushed into said receiving bore in a push-in direction; said support sleeve having an end stop for receiving the end of said hose thereagainst when pushed over said tubular support sleeve; said tubular support sleeve having an annular collar at one end thereof defining said end stop and said annular collar being configured to coact with said housing input part to sealingly clip said tubular support sleeve into said widened end region; said housing input part having an inner periphery at said end region; at least one annular seal bearing against said inner periphery in said widened end region; said annular seal being arranged concentrically in a space which is formed by said annular collar of said tubular support sleeve and the housing input part in the area of said widened end region of said receiving bore; an annular holding element bearing axially against said annular seal; said holding element being configured for the hose end of said hose pushed through said plug-in opening and into said receiving bore; said annular holding element being arranged concentrically in said space and bearing against said annular seal; said housing input part having an inner conical support surface in the area of said widened end region of said receiving bore with said inner conical support surface being tapered to narrow conically in a direction counter to said plug-in direction; said holding element being supported against said inner conical support surface; said holding element having an inner periphery and encircling cutting edges on said inner periphery for engaging the hose end; a fastening part having a throughflow bore aligned with said receiving bore; said fastening part being configured to attach said plug-in hose coupling to a motor vehicle unit; and, an overmold structure for non-detachably joining said fastening part to said housing input part and said tubular support sleeve; the method comprising the steps of:

placing said holding element in the form of a cutting lock washer into said housing input part against said inner conical support surface of said housing input part;

placing said sealing ring over said cutting lock washer into said widened end region of said housing input part;

inserting said tubular support sleeve into said housing input part on the end thereof situated opposite said plug-in opening and placing said tubular support sleeve into said widened end region with said annular collar so that said tubular support sleeve and the housing input part form a modular unit;

positioning said modular unit together axially with said fastening part and placing said modular unit and said fastening part into an injection mold so as to cause said widened end region and said end region of said fastening part to be mutually adjacent; and, coating the end regions of said housing input part and said fastening part in the injection mold by overmolding so as to form said overmold structure with said parts being fixedly and directly connected so as to form a composite modular unit after hardening completely devoid of a separate sealing element therebetween.

10. The method of claim 9, wherein the method comprises the further step of providing said fastening part in the form of a fastening part made of metal thereby facilitating the overmolding process by means of electrical resistance heating.

11. A method for making a plug-in hose coupling for a non-detachable connection of a tube or hose made of plastic or elastomeric material, said plug-in hose coupling including: a housing input part defining an interior and having a receiving bore formed therein; said receiving bore defining a plug-in opening for receiving an end of said hose and having an end region facing toward said interior and away from said plug-in opening and said receiving bore being widened in said end region thereof; a tubular support sleeve projecting concentrically into said interior and extending from said end region and said tubular support sleeve being adapted to accommodate said hose thereon when pushed into said receiving bore in a push-in direction; said support sleeve having an end stop for receiving the end of said hose thereagainst when pushed over said tubular support sleeve; said tubular support sleeve having an annular collar at one end thereof defining said end stop and said annular collar being configured to coact with said housing input part to sealingly clip said tubular support sleeve into said widened end region; said housing input part having an inner periphery at said end region; at least one annular seal bearing against said inner periphery in said widened end region; said annular seal being arranged concentrically in a space which is formed by said annular collar of said tubular support sleeve and the housing input part in the area of said widened end region of said receiving bore; an annular holding element bearing axially against said annular seal; said holding element being configured for the hose end of said hose pushed through said plug-in opening and into said receiving bore; said annular holding element being arranged concentrically in said space and bearing against said annular seal; said housing input part having an inner conical support surface in the area of said widened end region of said receiving bore with said inner conical support surface being tapered to narrow conically in a direction counter to said plug-in direction; said holding element being supported against said inner conical support surface; said holding element having an inner periphery and encircling cutting edges on said inner periphery for engaging the hose end; a fastening part having a throughflow bore aligned with said receiving bore; and, said fastening part being configured to attach said plug-in hose coupling to a motor vehicle unit; the method comprising the steps of:

placing said holding element in the form of a cutting lock washer into said housing input part against said inner conical support surface of said housing input part;

placing said sealing ring over said cutting lock washer into said widened end region of said housing input part;

inserting said tubular support sleeve into said housing input part on the end thereof situated opposite said plug-in opening and placing said tubular support sleeve into said widened end region with said annular collar so that said tubular support sleeve and the housing input part form a modular unit;

placing said modular unit alone into an injection mold; and, coating said modular unit in the end region of said modular unit to form said fastening part.

12. The method of claim 11, comprising the further step of forming said fastening part as a plug.

13. The plug-in hose coupling of claim 1, wherein said overmold structure includes a set of flats formed thereon to facilitate attaching said plug-in hose coupling with a work tool to the motor vehicle unit.

* * * * *

UNITED STATES PATENT AND TRADEMARK OFFICE
CERTIFICATE OF CORRECTION

PATENT NO. : 8,128,130 B2
APPLICATION NO. : 12/929296
DATED : March 6, 2012
INVENTOR(S) : Phillipe Robin et al.

It is certified that error appears in the above-identified patent and that said Letters Patent is hereby corrected as shown below:

In Column 1:
Line 44: delete "with," and substitute -- with -- therefor.
Line 49: delete "hose," and substitute -- hose -- therefor.

In Column 5:
Line 43: delete "and," and substitute -- and -- therefor.

In Column 6:
Line 18: delete "15," and substitute -- 15 -- therefor.

In Column 8:
Line 30: delete "for," and substitute -- for-- therefor.

Signed and Sealed this
Nineteenth Day of June, 2012

David J. Kappos
*Director of the United States Patent and Trademark Office*